May 1, 1951 R. L. DEDMAN 2,550,787
ELECTRICAL TESTING APPARATUS
Filed Nov. 5, 1946 4 Sheets-Sheet 2

INVENTOR.
RICHARD L DEDMAN,
BY
McMorrow, Berman & Davidson
ATTORNEYS.

May 1, 1951   R. L. DEDMAN   2,550,787
ELECTRICAL TESTING APPARATUS
Filed Nov. 5, 1946   4 Sheets-Sheet 3

INVENTOR.
RICHARD L. DEDMAN,
BY
McMorrow, Berman & Davidson
ATTORNEYS.

May 1, 1951        R. L. DEDMAN        2,550,787
ELECTRICAL TESTING APPARATUS
Filed Nov. 5, 1946        4 Sheets-Sheet 4
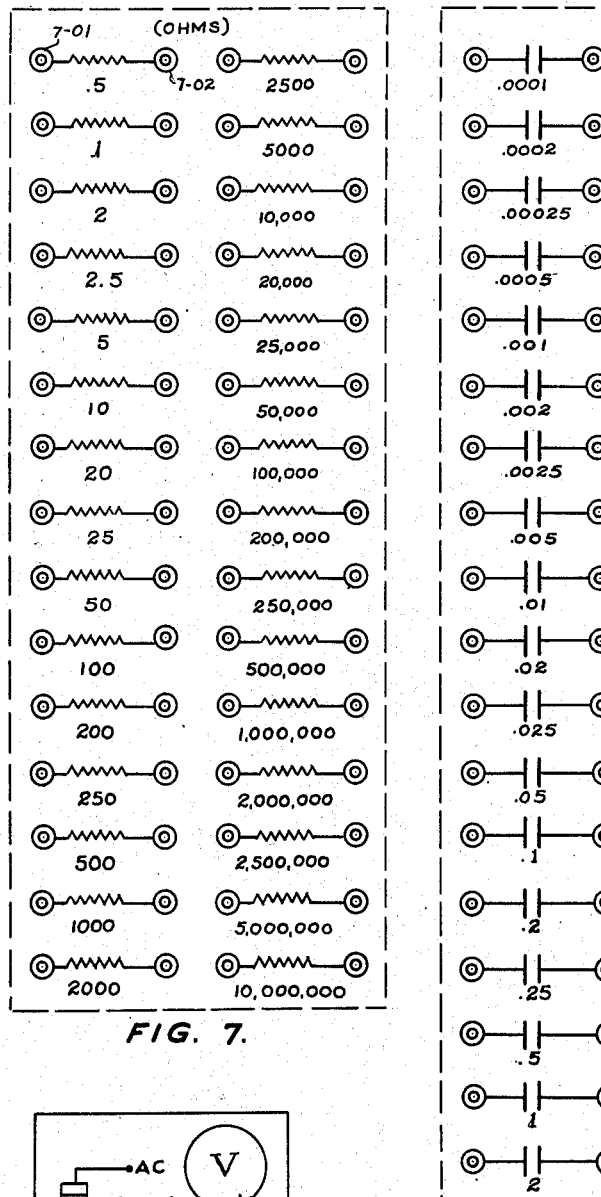
FIG. 7.
FIG. 8.
FIG. 9.
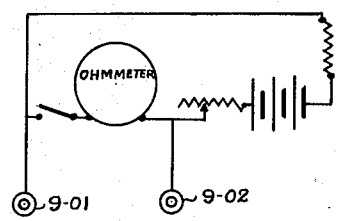
FIG. 10.
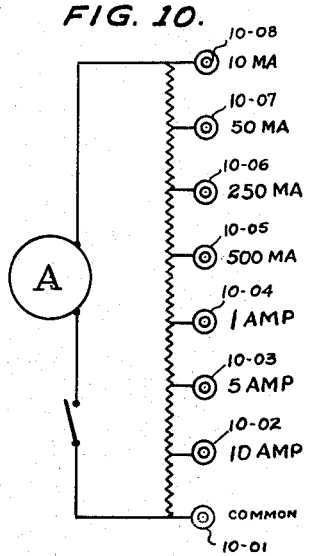
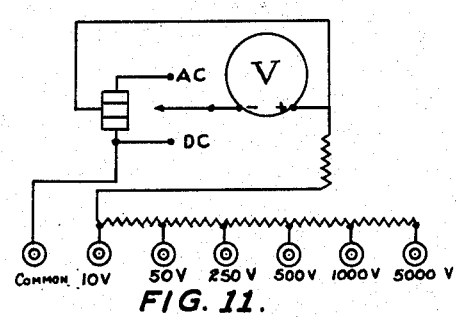
FIG. 11.
INVENTOR.
RICHARD L. DEDMAN,
BY
McMorrow, Berman & Davidson
ATTORNEYS.

Patented May 1, 1951

2,550,787

UNITED STATES PATENT OFFICE 2,550,787

ELECTRICAL TESTING APPARATUS

Richard L. Dedman, Blytheville, Ark.

Application November 5, 1946, Serial No. 707,857

3 Claims. (Cl. 250—20)

This invention relates to electrical testing apparatus. More particularly, it is intended to provide a convenient and compact arrangement of instrumentalities grouped together for the rapid and accurate diagnosis of faults in equipment such as radio receivers, amplifiers, and the like.

An object of the invention is to provide a group of circuits which will enable a service technician to identify faulty circuit components by substitution of equivalent components contained within the instrument.

A further object of the invention is to furnish an arrangement of such components which will provide the maximum facility in making connections to the equipment under test.

From another aspect, the invention combines in a single unitary instrument all of those components ordinarily encountered in radio receivers, amplifiers and the like, these components being so selected as to cover the entire range of values customarily employed, and being further selected to include particularly those components in which faults cannot be detected by visual inspection.

A further object of the invention is to permit the rapid identification of such faulty components by substitution methods in which a component known to be of the correct value and to be free of defects is substituted in the equipment under test for an electrically equivalent component suspected of causing the trouble under investigation. If the substitution improves the performance of the equipment, or clears the trouble under investigation, then a permanent replacement component is installed. In all probability this will solve the problem, but if it should not do so, the investigation may be quickly and conveniently continued by means of the invention until the trouble has been completely cleared.

A further object of the invention is to combine in a unitary instrument, facilities for making the electrical connections necessary for the substitutions described in the preceding paragraph with the greatest ease and rapidity and to provide means for grouping a plurality of components in various circuit combinations and arrangements to derive increased flexibility in test procedure.

Another object of the invention is to provide means for grouping the several components included in the test instrument in combinations which will furnish electrical values different from those of any individual component in the test instrument. This includes the connection of resistors, capacitors and the like in series, parallel or series-parallel arrangement.

These objects are attained by the means illustrated in the accompanying drawings, in which:

Figure 7 shows an arrangement for testing resistors.

Figure 8 shows a circuit for the testing of capacitors, more particularly those used in the high voltage and high frequency portions of the equipment under test.

Figure 9 shows a resistance measuring circuit.

Figure 10 illustrates a current measuring circuit.

Figure 11 shows a circuit for the measurement of both alternating and direct current voltages.

Figure 1:
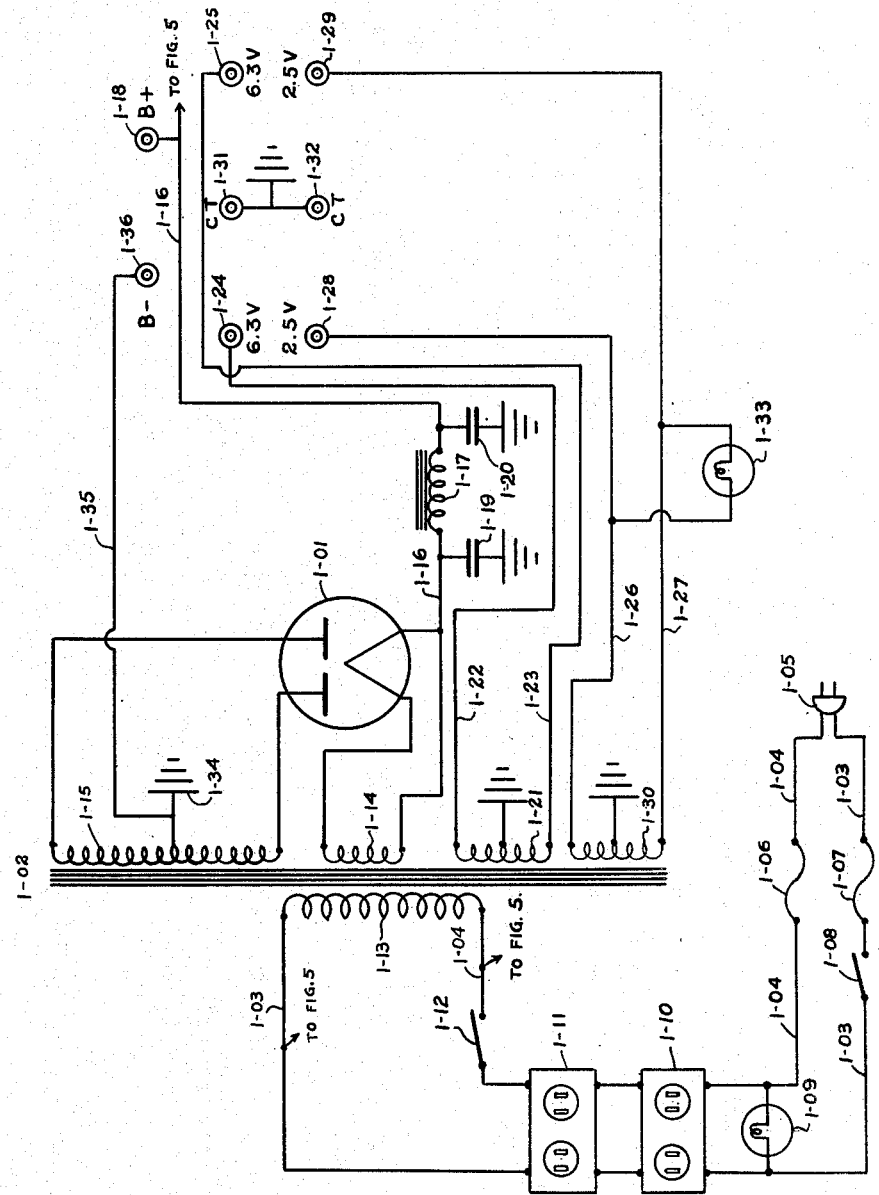
Figure 1 illustrates a power supply.

Referring to the drawings, Figure 1 shows the power supply of the test instrument. A full-wave rectifier 1—01 is energized through transformer 1—02 by means of power supply leads 1—03 and 1—04. Leads 1—03 and 1—04 are preferably connected to an attachment plug cap 105 for convenience in establishing connection to the alternating current supply mains. Leads 1—04 and 1—05 are provided with fuses 1—06 and 1—07 respectively. A switch 1—08 controls the entire power supply of the instrument. When switch 1—08 is closed, lamp 1—09 is lighted indicating the availability of power. At the same time, energy is supplied to the pair of twin convenience outlets 1—10 and 1—11 which are provided for the connection of other apparatus such as the radio receiver under test, an electric soldering iron, a lamp, or the like.

Closing switch 1—12 will permit energization of primary winding 1—13 of transformer 1—02. Upon such energization, secondary winding 1—14 provides current for heating the cathode of rectifier 1—01 and the anodes are supplied by the center-tapped high voltage secondary 1—15. The positive side of the supply is carried by conductor 1—16 through filter choke 1—17 to terminal 1—18 additional filtering action being supplied by capacitors 1—19 and 1—20. The filtered high voltage available at terminals 1—18 and 1—36 may be used as required in the course of testing. If the supply voltage exceeds that desired in making some particular test, the group of resistors illustrated in Figure 7 may be arranged in any desired combination to reduce the supply voltage to the voltage required.

The negative side of the high voltage supply is grounded to the chassis of the power unit at 1—34 and is carried via conductor 1—35 to terminal 1—36.

Low voltage secondary 1—21 supplies a potential such as 6.3 volts, for example, via conductors 1—22 and 1—23 to terminals 1—24 and 1—25 where it is available for the energization of such devices as heaters for the cathodes of vacuum tubes. Similarly, another low voltage such as 2.5 volts, for example, is supplied to terminals 1—28 and 1—29 via conductors 1—26 and 1—27 from secondary winding 1—30. It is to be noted that the center taps of windings 1—21 and 1—30 are grounded to the chassis of the power supply unit and that this chassis ground is available at terminals 1—31 and 1—32 for use as may be required.

Pilot lamp 1—33 is energized from secondary winding 1—30 thus indicating not only closure of switch 1—12 but also electrical continuity of winding 1—13 and likewise secondary winding 1—30.

Terminals such as 1—36, 1—18, 1—24, etc., and all other terminals similarly indicated diagrammatically by two concentric circles are of a type adapted to receive a cooperating connecting member secured to a flexible test conductor and are preferably of a type in which the connection may be established or removed with a maximum of ease and rapidity. For example, in the drawings these connecting members have been shown as the conventional phone tip jack adapted to receive the usual phone tip. These terminals are preferably of an insulated type which will prevent accidental contact with live or current carrying parts. Any form of terminal suitable for the purposes described may be utilized.

Figure 2:
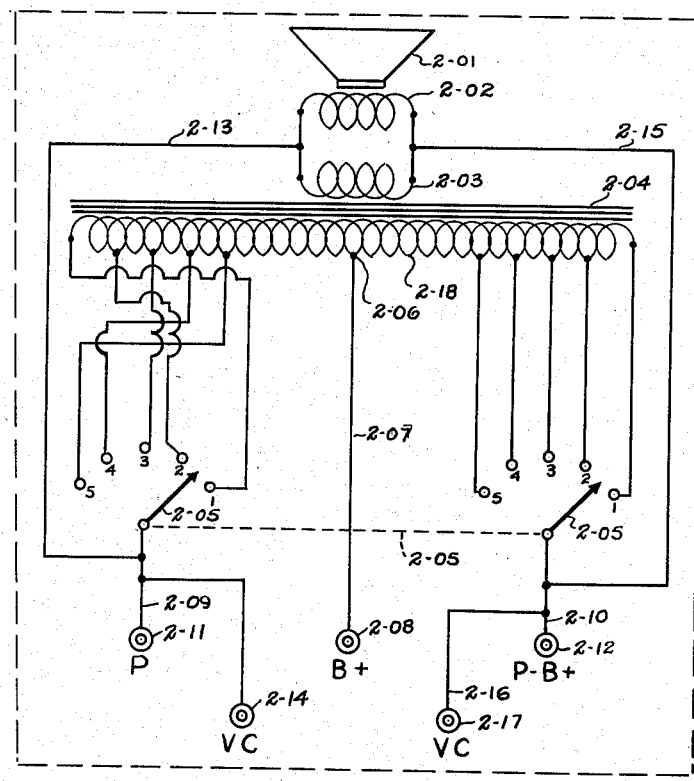
Figure 2 shows a loudspeaker, transformer, and tap-selecting switch.

Referring to Figure 2, a loudspeaker 2—01 having a voice coil 2—02 is adapted to be energized by the low impedance secondary winding 2—03 of transformer 2—04. To protect the voice coil 2—02 and primary winding 2—18 from possible injury which might be caused as a result of accidental application of the plate supply voltage to the coil circuit, I prefer to use the arrangement shown in Figure 2 in which the low impedance path formed by the parallel combination of voice coil 2—02 and secondary winding 2—03 is connected across tap switches 2—05 by conductors 2—13 and 2—15. The low D. C. resistance of secondary 2—03 acts as a protective shunt for voice coil 2—02 and for the high impedance primary 2—18 but because of its increased impedance at voice frequencies, secondary 2—03 does not interfere with the operation of the device for testing purposes. Primary winding 2—18 is provided with a plurality of taps for impedance matching which may be selected as desired by double-pole tap switch 2—05. A primary center tap 2—06 is provided for use in the case of push-pull or similar output circuits and is connected via conductor 2—07 to terminal 2—08. The two primary taps selected by tap switch 2—05 are connected via conductors 2—09 and 2—10 to terminals 2—11 and 2—12 respectively.

Figure 3:
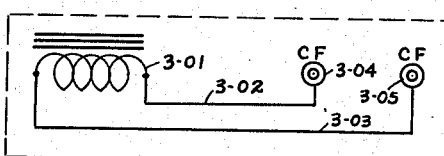
Figure 3 represents a choke coil or inductor.

In Figure 3, a filter choke, or conductor 3—01 suitable for use in circuits carrying direct current with superimposed alternating current is connected via conductors 3—02 and 3—03 to terminals 3—04 and 3—05 respectively.

Figure 4:
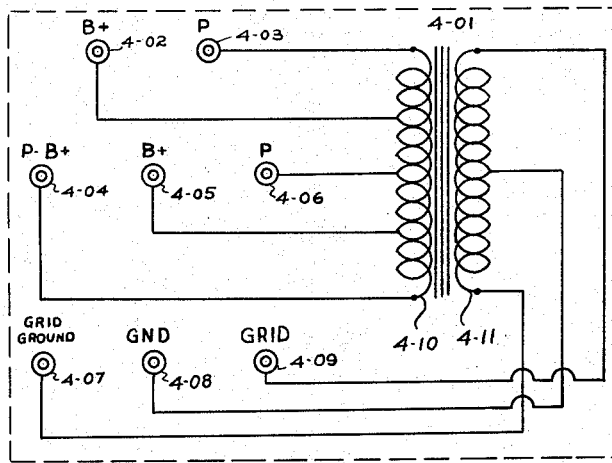
Figure 4 shows an audio frequency transformer and its associated connections.

Figure 4 shows an audio frequency transformer 4—01 having suitable characteristics and provided with a plurality of taps which permit its use as an input, interstage, or other type of transformer in either single sided or balanced push-pull circuits. The two windings 4—10 and 4—11 are each provided with taps which in turn are connected to terminals 4—02 to 4—09 inclusive.

Figure 5:
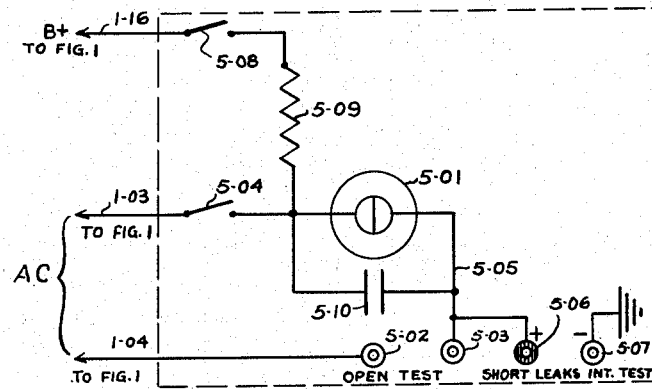
Figure 5 illustrates a circuit for testing capacitors.

Figure 5 illustrates a circuit for checking capacitors in order to determine whether there are faults such as an open circuit or a short circuit within the capacitor, or a leak, either steady or intermittent. The capacitor to be tested is connected across terminals 5—02 and 5—03. If the capacitor is internally open circuited, nothing will happen when push-button 5—04 is depressed. However, if the capacitor is functioning properly, or is short-circuited, upon pressing button 5—04 alternating current will flow through neon lamp 5—01 causing it to glow evenly on both electrodes through a circuit traceable along conductor 1—03, the contacts of push button 5—04, neon lamp 5—01, conductor 5—05, terminal 5—03, through the capacitor under test, terminal 5—02 and conductor 1—04 to the other side of the alternating current supply.

If neon lamp 5—01 glows upon pressing button 5—04 with the capacitor connected across terminals 5—02 and 5—03 the capacitor is then checked for leaks either steady or intermittent. This is done by connecting the capacitor across terminals 5—06 and 5—07. If the capacitor under test is short circuited, lamp 5—01 will glow steadily with one electrode upon pressing button 5—08, the glow being produced by direct current flowing through a circuit traceable from the positive side of the high voltage power supply of Figure 1 along conductor 1—16, through the contacts of push button 5—08, resistor 5—09, lamp 5—01, conductor 5—05, through the capacitor under test to terminal 5—07 and ground which is the negative terminal of the high voltage supply.

If the capacitor is in good condition lamp 5—01 will glow momentarily upon pressing button 5—08 but will be extinguished as soon as the charging current of the capacitor under test decreases sufficiently.

Figure 6:
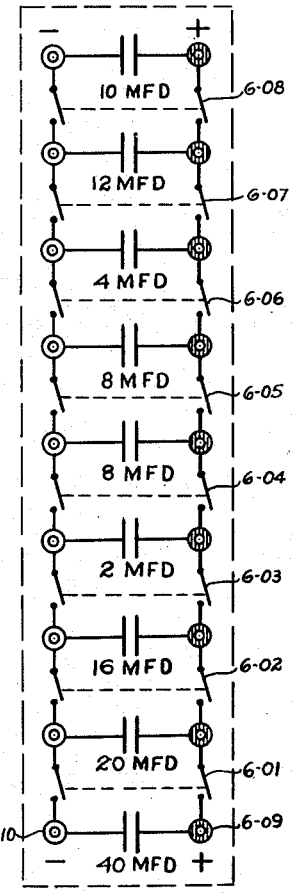
Figure 6 illustrates a circuit for testing capacitors, more particularly those of the electrolytic type.

In Figure 6, there are a group of electrolytic capacitors, which may have the capacitance values indicated. Any capacitor may be connected in multiple with an adjacent capacitor by closing an appropriate one of the double pole switches 6—01 to 6—08 inclusive and other combinations may be established by closing two or more such switches. Each capacitor is individually connected to terminals such as 6—09 and 6—10.

In Figure 7 there are shown a group of resistors each individually connected to terminals such as 7—01 and 7—02. These resistors may have the resistance values indicated or any other set of values selected for convenience in establishing combinations to yield any desired value of resistance. The resistors preferably are of comparatively large heat dissipating capacity to permit their use in any portion of the equipment under test.

Figure 8 shows a group of capacitors arranged in a manner similar to that of the resistors of Figure 7. These capacitors are preferably of a type employing insulation such as mica or paper which will permit their use in the high voltage or high frequency portions of the equipment under test.

Figure 9 shows a resistance measuring circuit which may have any desired or conventional form of arrangement. The resistor whose resistance is to be determined is connected across terminals 9—01 and 9—02.

Figure 10 is a current measuring circuit provided with a series of shunts for various ranges the connections appearing at terminals 10—01 to 10—08 inclusive. Any other convenient group of ranges may be employed if desired. Although the instrument shown is a direct current instrument, the circuit may be modified to provide for the measurement of alternating currents in addition to direct currents, or a separate circuit for the measurement of alternating currents may be added.

Figure 11 is a voltage measuring circuit arranged to provide for the measurement of several ranges of alternating current voltages and direct current voltages. The various ranges are brought to terminals, but a tap switch may be used or any other conventional or desirable arrangement.

Figure 12:
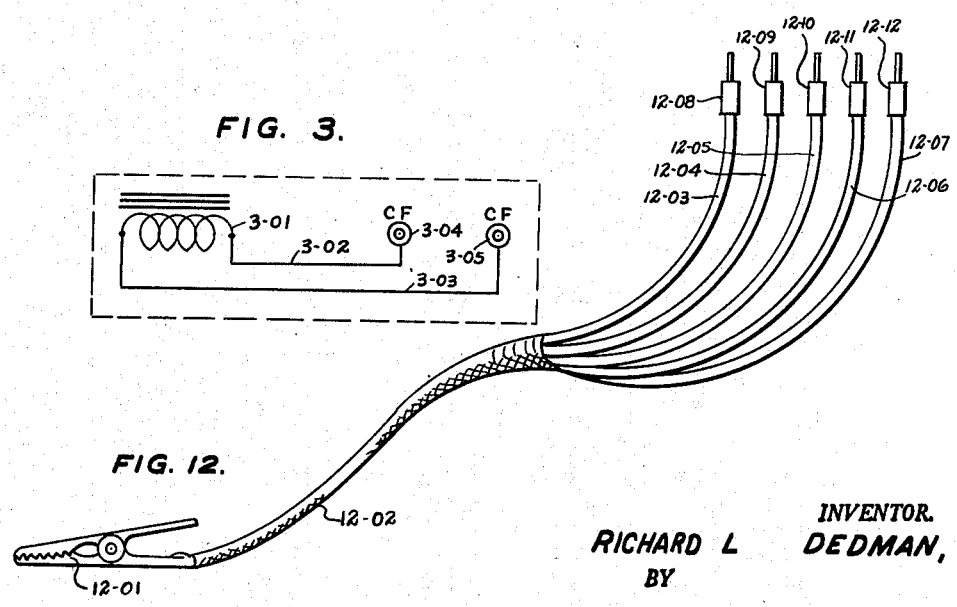
Figures 12, 13 and 14 show test leads.
Figure 13:
Figure 14:
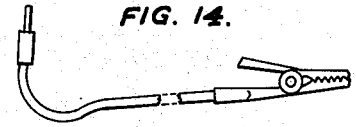

Figure 12 shows a test lead which comprises a clip 12—01 at one end of a flexible conductor 12—02 which branches out into several other conductors 12—03 to 12—07 inclusive each being provided with a suitable terminal which may be of the form of a phone tip such as 12—08 to 12—12 inclusive. This particular form of test lead is especially useful in connecting a group of capacitors in multiple from the arrangement indicated in Figure 8, and in making the total capacitance available at the clip ends. This type of lead also may be used for selecting other multiple combinations from the various figures or from a combination of the various figures. Other simpler forms of test lead such as those shown in Figures 13 and 14 may also be used. The lead of Figure 13 is useful in establishing interconnections among the terminals of the test unit and the lead of Figure 14 avoids the possibility of accidental contact with other current carrying parts where only one of the phone tips is used. In the case of the lead of Figure 12 this would leave a multiplicity of loose phone tips any one of which might accidentally establish contact with some other part of the circuit.

The various circuits illustrated in Figures 1 to 11 inclusive are mounted in a compact unitary arrangement. The particular arrangement is not shown, but it may take any desirable form such that it will be readily understandable by the service technician. It should preferably be sufficiently light and compact to render the test apparatus readily portable, but in the case of permanent installations such as those in service shops, it may be more bulky and may be spread out and may use a much greater variety of individual units. In the case of a portable test instrument it may be desirable to include space for a selection of test leads including one or more of the types illustrated in Figures 12, 13 and 14 and possibly other items such as tools, gauges or adjusting devices.

In operation, a radio receiver, amplifier or similar equipment which is not operating properly is to be tested and the trouble eliminated. Frequently such trouble is caused by a fault or defect in one of the components such as a resistor, capacitor, speaker, audio frequency transformer or the like. By means of the invention, a replacement component may be substituted quickly and conveniently for any component suspected to be faulty or defective. The invention includes test instrumentalities for preliminary location of such defective components and an assortment of equivalent components which may be grouped to give the required electrical constants arranged for rapid substitution in the circuit for the component suspected of being faulty or defective. Each component is preferably so selected that it will be capable of operating in any part of the circuit of the equipment to be tested. Capacitors should preferably have high working voltages, resistors, high power dissipating ability, and inductors such as the unit illustrated in Figure 3 a high current carrying ability. These properties of high performance ability must be balanced against considerations of weight and space requirements where the invention is to be embodied in portable form. In this manner, the trouble may be quickly located and the test results confirmed by substitution.

While I have shown but one embodiment of my invention it is to be understood that changes may be made without departing from the scope of the invention as defined in the appended claims.

I claim:

1. In a testing instrument for radio and similar equipment, a plurality of substitution components, test jacks connected to the terminals of the respective components, and a pair of connectors, each connector comprising a conductor having a jaw clip connected to one end thereof and having a plurality of branch conductors connected to the other end thereof, each branch conductor having connected to its free end a phone tip adapted to be received in a test jack, whereby said connectors may be connected simultaneously to one or more of said substitution components.

2. In a testing instrument for radio and similar equipment, a plurality of groups of substitution components, each group comprising components which are electrically similar but have different values, test jacks connected to the terminals of the respective components, and a pair of conductors, the conductors each having a jaw clip connected to one end thereof and being multiply branched at the other end thereof and being provided with phone tips at each of the ends of its multiple branches, whereby said conductors may be connected simultaneously to one or more of said substitution components.

3. In a testing instrument for radio and similar equipment, a plurality of groups of substitution components, certain of said groups comprising elements which are electrically similar but which are graduated in value, test jacks connected to the terminals of the respective substitution components, and connectors comprising conductors having at one end phone tips receivable in the test jacks and at the other end jaw clips, said connectors including at least one conductor having multiple branches each provided with phone tips, whereby said latter conductor may be connected simultaneously to a plurality of said substitution components.

RICHARD L. DEDMAN.

REFERENCES CITED

The following references are of record in the file of this patent:

UNITED STATES PATENTS

| Number | Name | Date |
|---|---|---|
| 731,209 | Northrup | June 16, 1903 |
| 1,251,440 | Sultzer | Dec. 25, 1917 |
| 1,560,278 | Mahan | Nov. 3, 1925 |
| 1,983,665 | Hickok | Dec. 11, 1934 |
| 1,986,414 | Saunders | Jan. 1, 1935 |
| 2,134,059 | Schade | Oct. 25, 1938 |
| 2,373,156 | Wilhelm | Apr. 10, 1945 |

OTHER REFERENCES

Kroll, Radio Craft, July 1942, pages 650 and 651.

Radio Craft (Carpenter), April 1944, page 416.

M & H Sporting Goods Company catalog for 1934, page 7.